United States Patent
Miller et al.

(10) Patent No.: US 7,534,991 B2
(45) Date of Patent: May 19, 2009

(54) ATHERMALIZED BIREFRINGENT FILTER APPARATUS AND METHOD

(75) Inventors: Peter Miller, Cambridge, MA (US); Leo Mirkin, Brookline, MA (US)

(73) Assignee: Cambridge Research & Instrumentation, Inc., Woburn, MA (US)

( * ) Notice: Subject to any disclaimer, the term of this patent is extended or adjusted under 35 U.S.C. 154(b) by 0 days.

(21) Appl. No.: 11/827,077

(22) Filed: Jul. 10, 2007

(65) Prior Publication Data

US 2009/0014632 A1    Jan. 15, 2009

(51) Int. Cl.
  *G02F 1/133*  (2006.01)
  *G02F 1/1347*  (2006.01)
(52) U.S. Cl. .................. 250/226; 250/216; 250/550; 359/246; 349/18; 349/75
(58) Field of Classification Search .................. 349/18, 349/75, 76, 72; 359/246, 253, 256; 250/226, 250/216, 550
  See application file for complete search history.

(56) References Cited

U.S. PATENT DOCUMENTS

| | | | |
|---|---|---|---|
| 2,718,170 A | 9/1955 | Lyot | |
| 4,548,479 A | 10/1985 | Yeh | |
| 5,247,378 A | 9/1993 | Miller | |
| 7,009,680 B2 * | 3/2006 | Cavanaugh et al. | ......... 349/196 |

OTHER PUBLICATIONS arXiv:astro-ph/0006059 v1 Jun. 5, 2000—Tunable Imaging Filters 8 pgs.
G. Shabtay and E. Eidinger, Tunable birefringent filters—optimal iterative design, Dec. 30, 2002 / vol. 10, No. 26 / Optics Express 1534-1541.
S. M. Kobtsev and N. A. Seventsitskaya, Application of birefringent filters in continuous-wave tunable lasers: a review, Opt. Spektrosk. 73, 196-212 (Jul. 1992).

* cited by examiner

*Primary Examiner*—Kevin Pyo
(74) *Attorney, Agent, or Firm*—Cohen Pontani Lieberman & Pavane LLP

(57) ABSTRACT

An athermalized birefringent filter for shifts in center wavelength and in bandwidth incorporates fixed retarder elements such as quartz or film retarders, along with electrically-variable retarder elements such as liquid crystal variable retarder cells. A control mechanism determines the amount of thermal drift in the fixed retarder element and produces an equal change in the variable retarder element. The sign of the change depends on whether the variable retarder element adds its retardance with that of the fixed retarder element, or opposes it. This change compensates for the thermal drift of the fixed retarder element. Further, the variable retarder element is constructed to provide the necessary range of retardance adjustment for spectral tuning and thermal compensation over a target thermal range. The control mechanism ensures that, for any specified wavelength, the birefringent filter operates in the same order over the full target thermal range. Multispectral imaging systems are provided based on these filters which provide athermalized response.

40 Claims, 11 Drawing Sheets

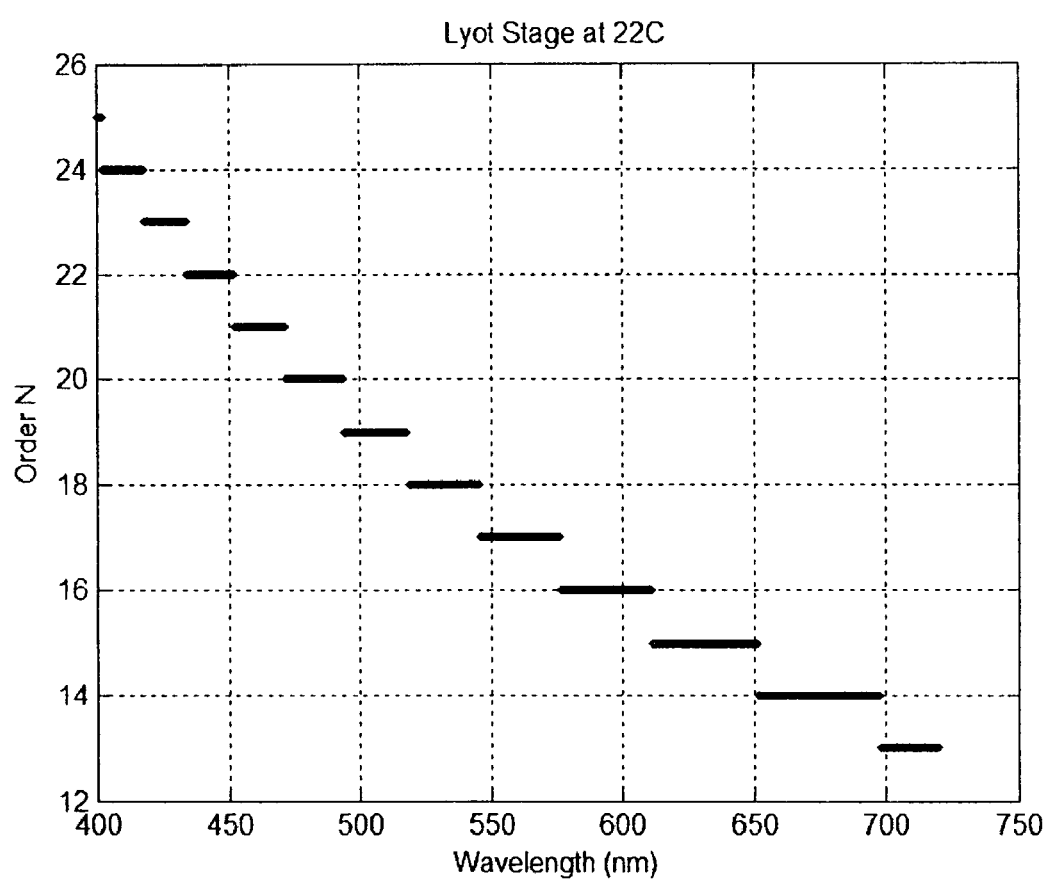
Figure 2 – PRIOR ART

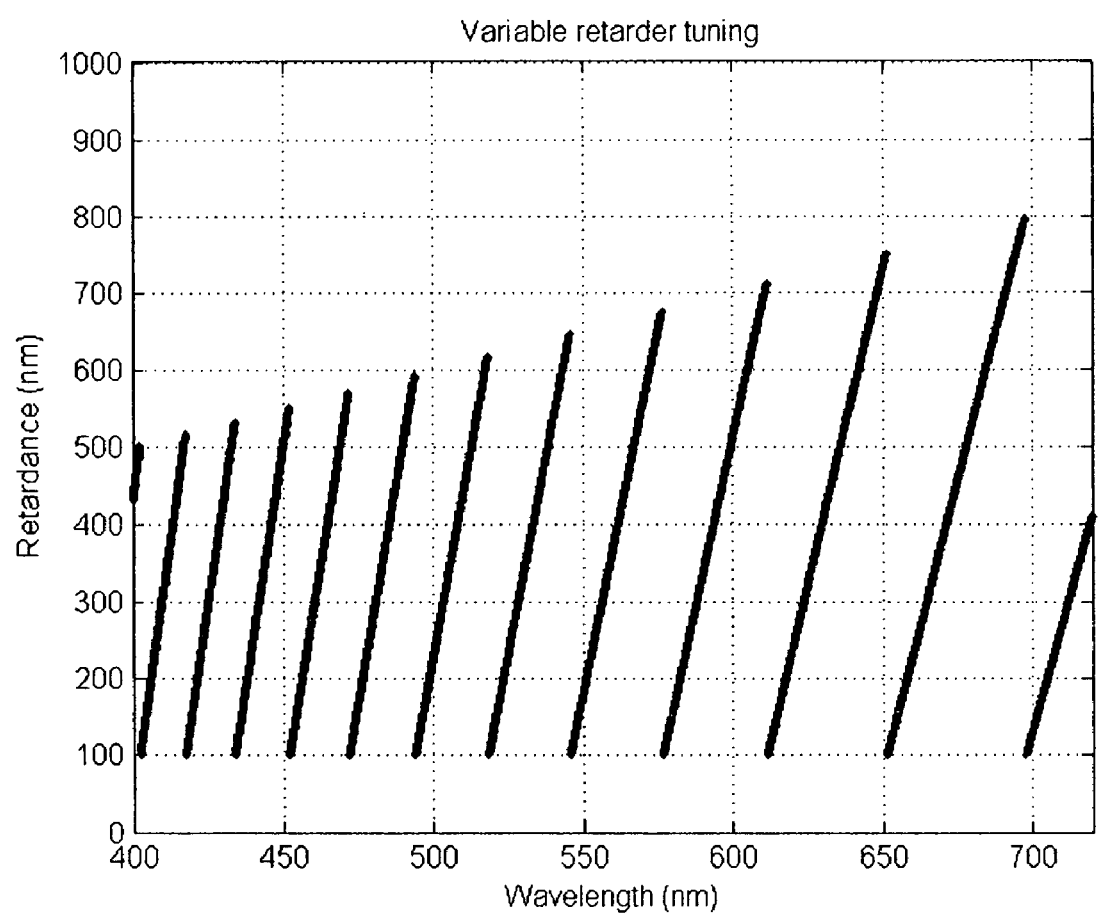
Figure 3 – PRIOR ART

US 7,534,991 B2

ATHERMALIZED BIREFRINGENT FILTER APPARATUS AND METHOD

BACKGROUND OF THE INVENTION

1. Field of the Invention

The invention relates to birefringent filters including tunable birefringent filters which incorporate fixed retarder elements and variable retarder elements; and to multispectral imaging systems using such filters.

2. Description of the Related Art

Filters based on liquid crystal variable retarder elements are described in U.S. Pat. No. 5,247,378. That patent describes methods for determining the proper drive voltage to apply to a liquid crystal cell in order to produce a desired optical retardance, based on its electrical capacitance properties. It also describes a tuning method which reduces or eliminates drift in the center wavelength of a birefringent filter, wherein a control means determines a target retardance value for the variable retarder element, based on the temperature of the filter assembly and an estimate of the temperature coefficient of the fixed retarder elements.

Commercial liquid crystal tunable filters (LCTFs) are available from Cambridge Research & Instrumentation, Inc (Woburn, Mass.) under the trade name VariSpec filters.

It is typical that tunable filters use an algorithm where the variable retarder is set to a value such that the combination of the fixed retarder element and the variable retarder element produce a net retardance of $N\lambda$; or of $(N+\frac{1}{2})\lambda$; or of $(N+\frac{1}{4})\lambda$ or $(N+\frac{3}{4})\lambda$; depending on the filter design. In these expressions, N is an integer and $\lambda$ is a wavelength of interest such as the wavelength for which the desired transmission maximum is sought. For a given design, one of these expressions may be sought because it corresponds to a peak in the transmission function for the overall filter, with the choice of expression depending on whether the retarder is in a Lyot stage with parallel polarizers, crossed polarizers, or some other arrangement such as an Evans split-element stage.

Liquid crystal variable retarders have limited range of adjustment, but an adjustment range of $\lambda$ is sufficient to ensure there is always at least one setting available for which the combined retardance meets the appropriate N, $N+\frac{1}{2}$, $N+\frac{1}{4}$, or $N+\frac{3}{4}$ criterion.

The value of N often depends upon the tuning wavelength $\lambda$, and this dependence can be denoted $N(\lambda)$. The filter bandwidth depends on tuning wavelength $\lambda$, and this dependence can be denoted $B(\lambda)$.

Optical filters are operated in a variety of environments, including environments where temperature changes may occur. It is desirable that a tunable filter exhibit athermal response, meaning that none of its properties are altered when the temperature changes.

Multispectral imaging systems based on a combination of tunable birefringent filters, imaging detectors, and relay optics are sold commercially by Cambridge Research & Instrumentation, Inc (Woburn, Mass.). The spectral properties of the system, such as bandwidth, center wavelength, and throughput, are principally determined by the birefringent filter.

SUMMARY OF THE INVENTION

The invention involves the recognition that in many tunable filters, $N(\lambda)$ is inherently stepwise in $\lambda$, and that $B(\lambda)$ contains discontinuities in $\lambda$ as a result; the invention provides methods and apparatus to minimize unwanted consequences of this situation.

One aspect of the invention involves the recognition that filter tuning of the prior art can generate significant thermal artifacts as a consequence of the stepwise nature of $N(\lambda)$, and provides methods and apparatus for achieving athermal filter bandwidth response $B(\lambda)$.

Another aspect of the present invention is to provide tunable filters and tunable filter stages in which discontinuities in filter bandwidth are managed by a control circuit or processor in a way that ensures that discontinuities in $N(\lambda)$ do not change with temperature.

In one aspect, the invention provides a filter for which $N(\lambda)$ is free of discontinuities over a selected portion of its range, which results in a bandwidth $B(\lambda)$ that is free of discontinuities over this range.

In one aspect, the invention provides a tunable filter for which $N(\lambda)$ and $B(\lambda)$ contain one or more discontinuities over the tuning range; however, the filter bandwidth $B(\lambda)$ is independent of temperature and the tuning accuracy is unaffected by temperature. In this aspect, the overall filter throughput is independent of temperature, for all wavelength settings.

In another aspect, the invention provides a tunable filter for which both the above benefits are attained, meaning that $B(\lambda)$ is free of discontinuities in $\lambda$ over a selected range of tuning wavelengths, and this is true at all temperatures.

It is one aim of this invention to provide a filter which is athermalized in its center wavelength response, in its peak transmission, and in its bandwidth. In this aspect, it provides a tunable filter for which the center wavelength is accurate at all temperatures; the transmission level is independent of temperature; and the bandwidth function $B(\lambda)$ is independent of temperature. The result is a filter which may be used to view spectrally extended sources over a range of temperatures and the optical flux levels through the filter are free of thermal variation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 shows the value of $N(\lambda)$ for the stage of FIG. 1 as a function of the peak-transmission wavelength $\lambda$, using the tuning rules of the prior art. In this figure, the variable retarder was set to the lowest possible value consistent with achieving integral N for the combination of retarders, at the wavelength $\lambda$ being transmitted. $N(\lambda)$ is shown at 22C as segments 20a through 20m as the stage is tuned to transmit light of various wavelengths ranging from 400 nm to 720 nm. The function $N(\lambda)$ is inherently stepwise in nature, since N must everywhere be integral-valued to meet tuning criteria yet must span a range of values over the wavelength range.

FIG. 3 shows the variable retardance required at 22C as curve 31 under these tuning rules.

DETAILED DESCRIPTION OF THE PRESENTLY PREFERRED EMBODIMENTS

The invention relates to the observation that tunable filters of the prior art, in compensating for thermal drift in fixed retarder elements so as to provide accurate wavelength response over temperature, could introduce changes in the filter bandwidth. The reason for this is seen by considering the regions adjacent the points where $N(\lambda)$ undergoes stepwise, discontinuous changes, as shown in FIG. 2.

A common measure of a filter's bandwidth $B(\lambda)$ is its full-width at half-maximum (FWHM), and for a Lyot filter stage comprising a fixed retarder and a variable retarder whose retardances are additive, $$B=FWHM\sim\lambda/2N=\lambda^2/2R_{net}=\lambda^2/2(R_{fixed}+R_{variable}) \quad [1]$$

Equation 1 is for a Lyot stage with parallel polarizers; a similar equation can be derived for a Lyot stage with crossed polarizers, or for other types of birefringent filter stages.

The variable retarder is used to compensate for thermal drift in the fixed retarder. So, if $R_{fixed}$ increases due to changing temperature, the value of $R_{variable}$ must be reduced by a like amount. Yet at some temperature a point can be reached where $R_{variable}$ must exhibit a retardance value that cannot be actually achieved by this component. When this occurs at the bottom end of the range of adjustment, a prior art tuning method is to set the variable retarder to a value that is greater than the unattainable value by an amount $\lambda$, to obtain a value that can actually be produced. Similarly, if the variable retarder must be set to a value that lies above the top end of the range of adjustment, the prior art provided for setting it to a value that is lower than the unattainable value by an amount $\lambda$.

In the prior art, if there were more than one value for $R_{variable}$ that satisfied the tuning criteria for integral N, and also lay within the adjustment range of the variable retarder, the decision of which value to use was made according to rules such as: choose the lowest of these values; choose the highest of these values; choose a value which is linked to a choice of the same type for another stage in the overall filter assembly.

In the prior art, the choice of which value to use was not based on a consideration of what conditions might be present across a range of temperatures.

Consequently, the value of $N(\lambda)$ in a prior art filter can depend on temperature, because the criteria used for setting the variable retarders does not include a requirement that $N(\lambda)$ be invariant with temperature.

Figure 4:
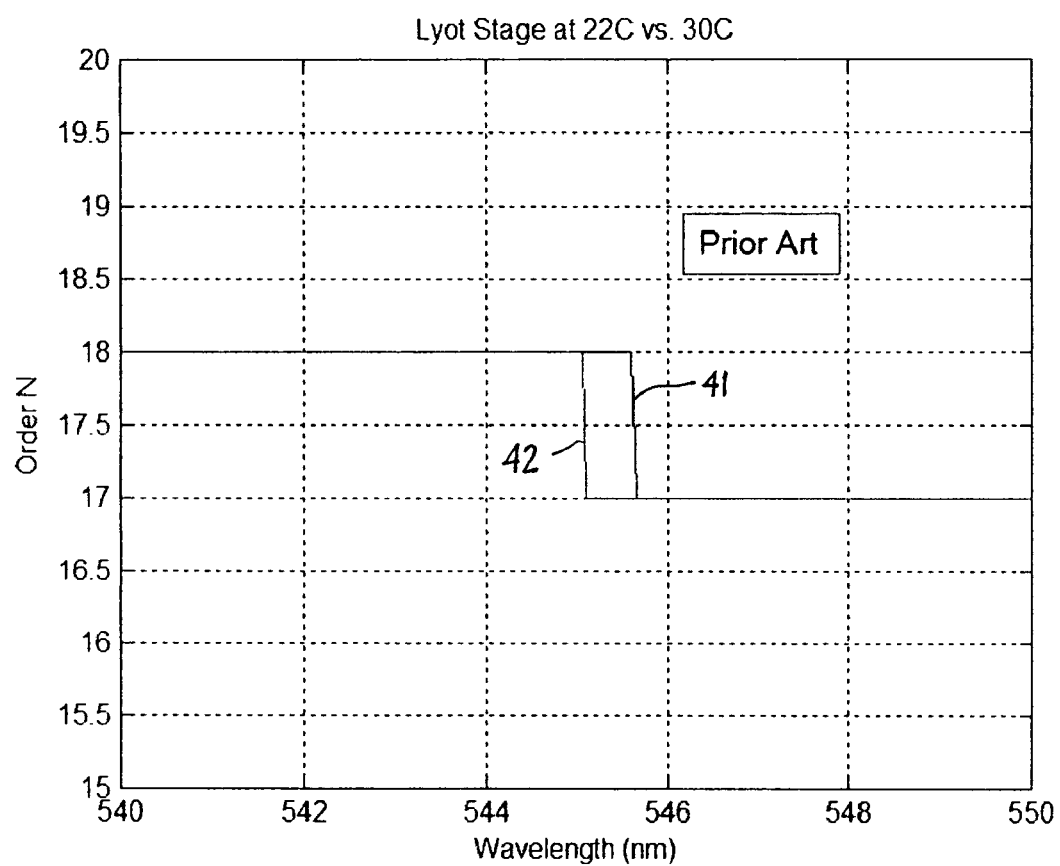
FIG. 4 shows $N(\lambda)$ for this stage at 22C and at 30C, for a narrow range of wavelengths, using the same tuning rules as curves 41 and 42. At 22C the stage is in order 18 in the range $\lambda$=545.5 nm, but it is in order 17 at 30C.
Figure 5:
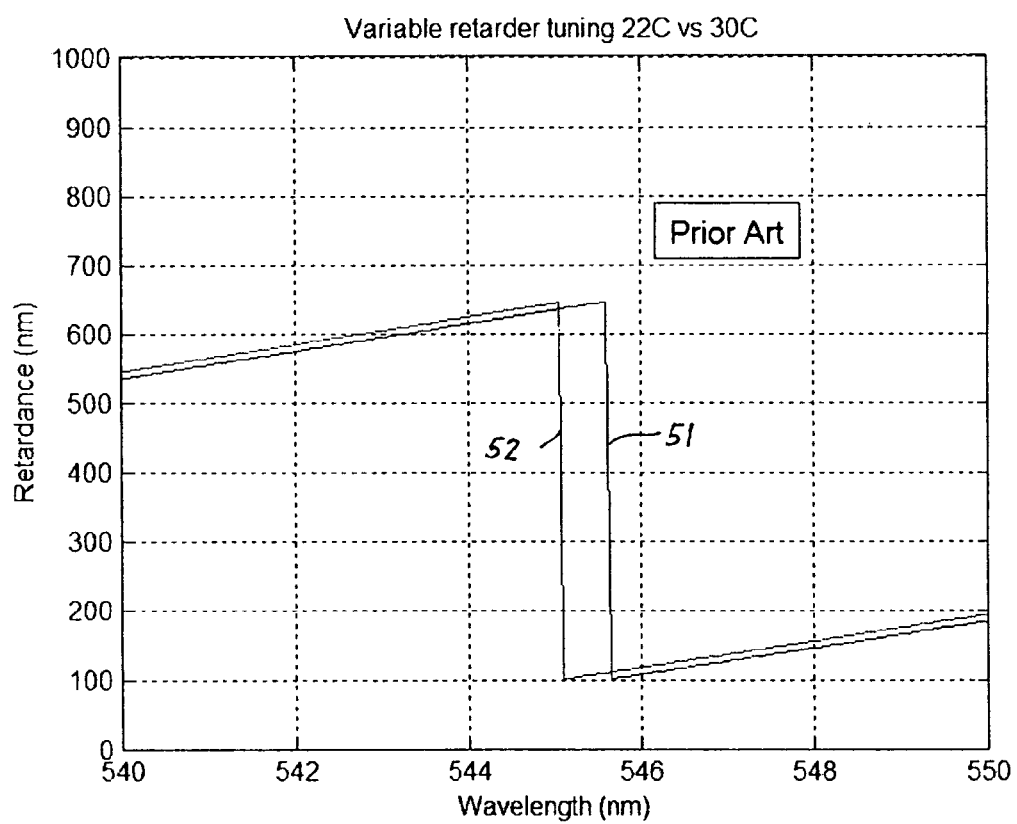
FIG. 5 shows the variable retardance required at 22C and at 30C, over a narrow range of wavelength settings, as curves 51 and 52. Note that these curves are slightly offset, and that the discontinuity associated with the step in $N(\lambda)$ near 545 nm does not occur at the same $\lambda$ location for the two curves.

This is illustrated in FIG. 4, where the integral order $N(\lambda)$ of the prior art filter stage is depicted at two different temperatures. In the region near 546 nm, the variable retarder setting is reduced by approximately one wave at 30C, compared to the value it has at 22C. This is because the fixed retarder has less retardance at higher temperatures, and the variable retarder is required to make up the difference; so the retardance $R_{variable}$ which satisfies the tuning criterion increases with temperature. At some temperature, the point is reached where there are two values for $R_{variable}$ within the variable retarder's range that satisfy the tuning criterion. In this example, the choice of which value to use was made by the simple rule: use the lowest value of $R_{variable}$ consistent with the tuning criterion.

Overall, then, the result is that when the temperature changed enough that the variable retarder could meet the tuning criterion with a low value, instead of a value approximately one wave higher, the order N was reduced by one at that wavelength.

Using this approach of the prior art has the effect of preserving full transmission at wavelength $\lambda$; and of maintaining the center wavelength accuracy, because the tuning criterion of integral $N(\lambda)$ is always met. In these ways it does athermalize the filter. However, since it has the effect of changing $N(\lambda)$, respectively, the bandwidth of the filter $B(\lambda)$ changes with temperature.

This is important because $B(\lambda)$ affects the area under the transmission curve: if the bandwidth is increased or decreased, an instrument viewing a scene through the filter will see its signal level change as a consequence, approximately in the amount:

$$\text{Signal strength ratio}\sim N/(N+1)=1-1/N \quad [2a]$$

or $$\text{Signal strength ratio}\sim (N+1)/N=1+1/N \quad [2b]$$

where equation 2a applies in the case where the order is increased and equation 2b applies where it is decreased. In either instance, the normalized change in signal is of order 1/N.

Equations 2a and 2b apply for the case of a spectrally extended scene, with equal energy at all wavelengths in the vicinity of λ. Yet the signal strength also changes for quasi-monochromatic sources: for example, if one views a laser with a filter that is tuned to a nearby wavelength, then changes in the filter bandwidth B(λ) will affect the transmission at the laser wavelength, so the flux passing through the filter is affected.

The magnitude of the bandwidth changes can be large. Take the case of a filter with 10 nm bandwidth at 540 nm, for which N(540 nm)=27. This means that a shift in the signal level due to the order-hop effect is of order 1/27=3.7 percent. Filters operating in lower order N(λ) are affected to an even greater degree.

Even for relatively narrowband filters, the effect is not negligible, and can be important. For example, an infrared imaging system using a Lyot type filter with B(λ) of 6 nm at 1350 nm to view quasi-continuous sources operates in order N(1350 nm)=113. It will see a change of 0.89% when the order N(λ) changes by one; such a change in signal level is readily detected in many systems, and is important in many applications such as analytical measurements, multispectral imaging, or quantitative metrology. Accordingly, multispectral imaging systems which incorporate the present invention will achieve improved accuracy and stability.

Figure 6:
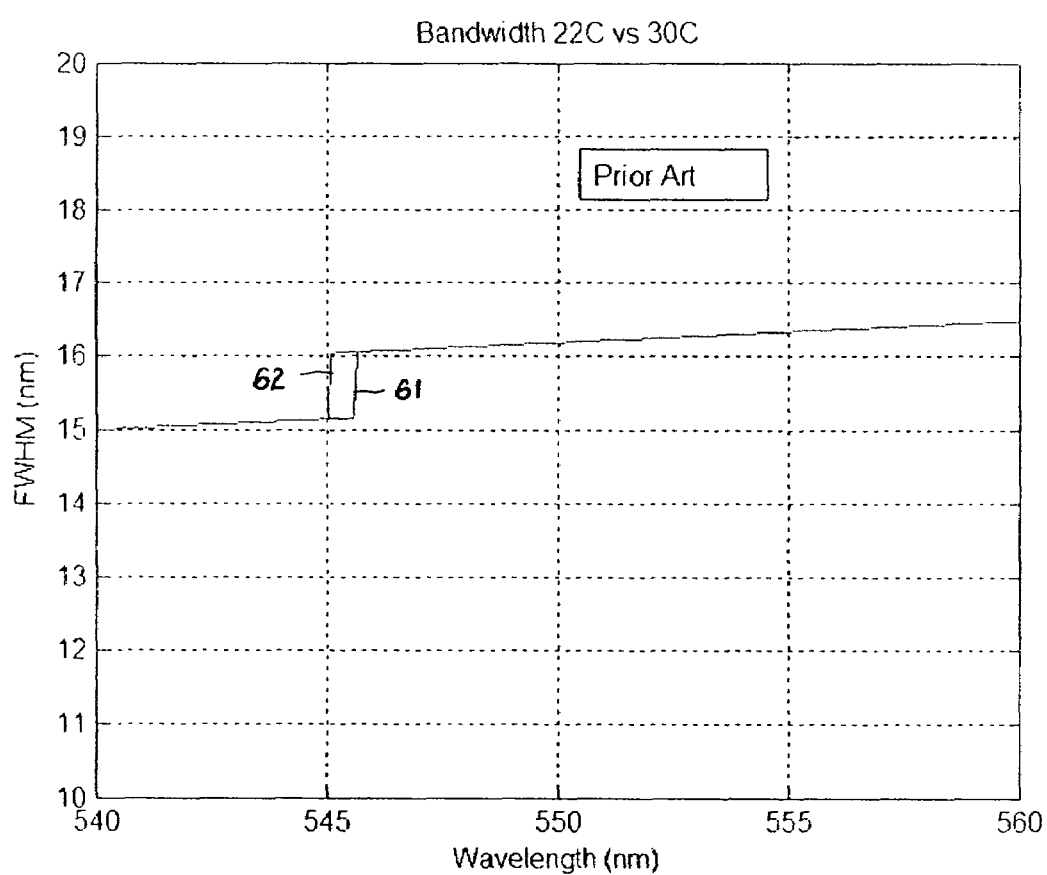
FIG. 6 shows the bandwidth of this filter stage at 22C and at 30C, as it is tuned through the range 540-560 nm, as curves 61 and 62. Notice that there is a discontinuous jump upwards in each curve, when the $N(\lambda)$ has a step, and the $\lambda$ location varies with temperature.
Figure 7:
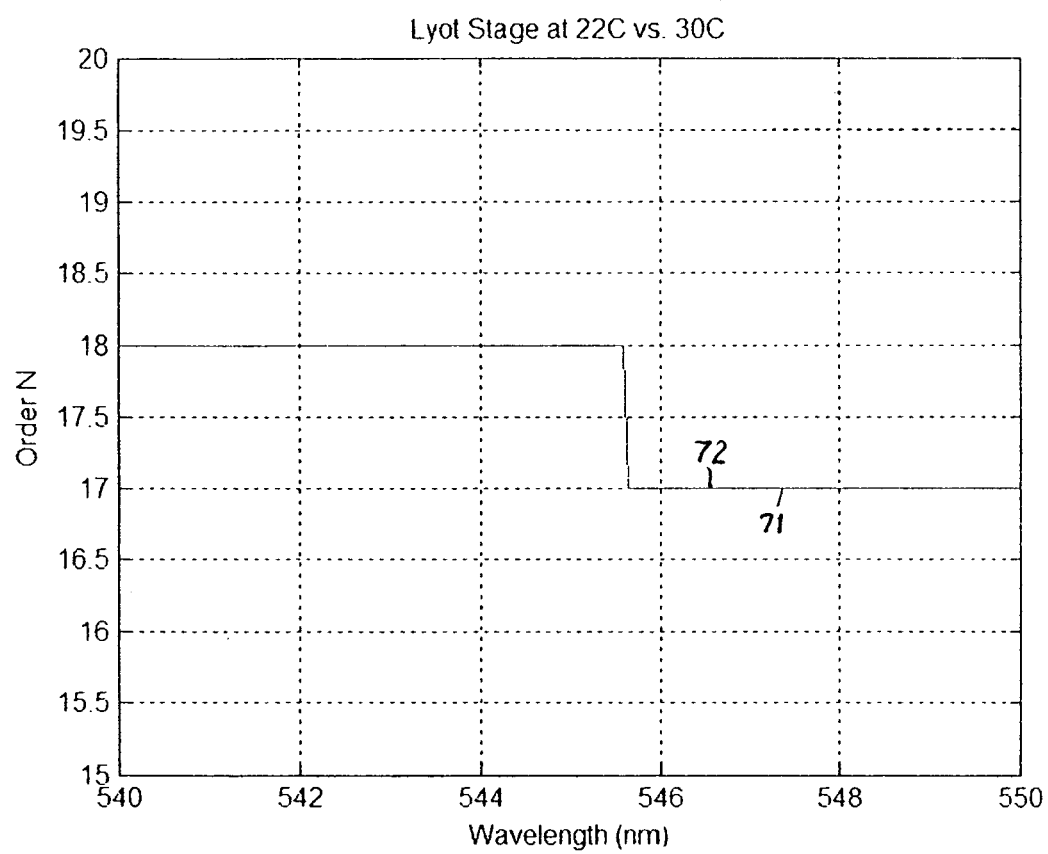
FIG. 7 shows the order $N(\lambda)$ of the Lyot stage of FIG. 1 when it is tuned in accordance with the present invention, and wherein the variable retarder is made in accordance with the invention. The order is identical for the two temperatures, so the curves 71 and 72 are indistinguishable.
Figure 8:
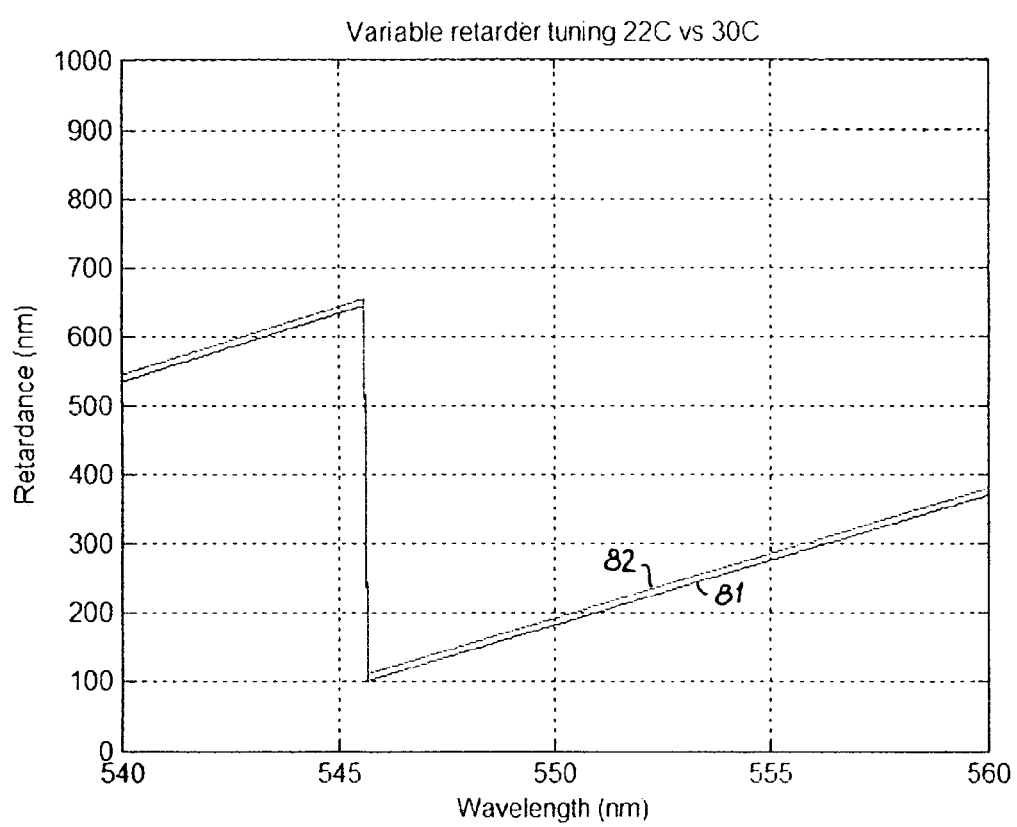
FIG. 8 shows the variable retardance required at 22C and 30C when this stage is tuned in accordance with the present invention, as curves 81 and 82. The retardance is always slightly higher at 30C, and the discontinuity occurs at the same wavelength $\lambda$, just below 546 nm.
Figure 9:
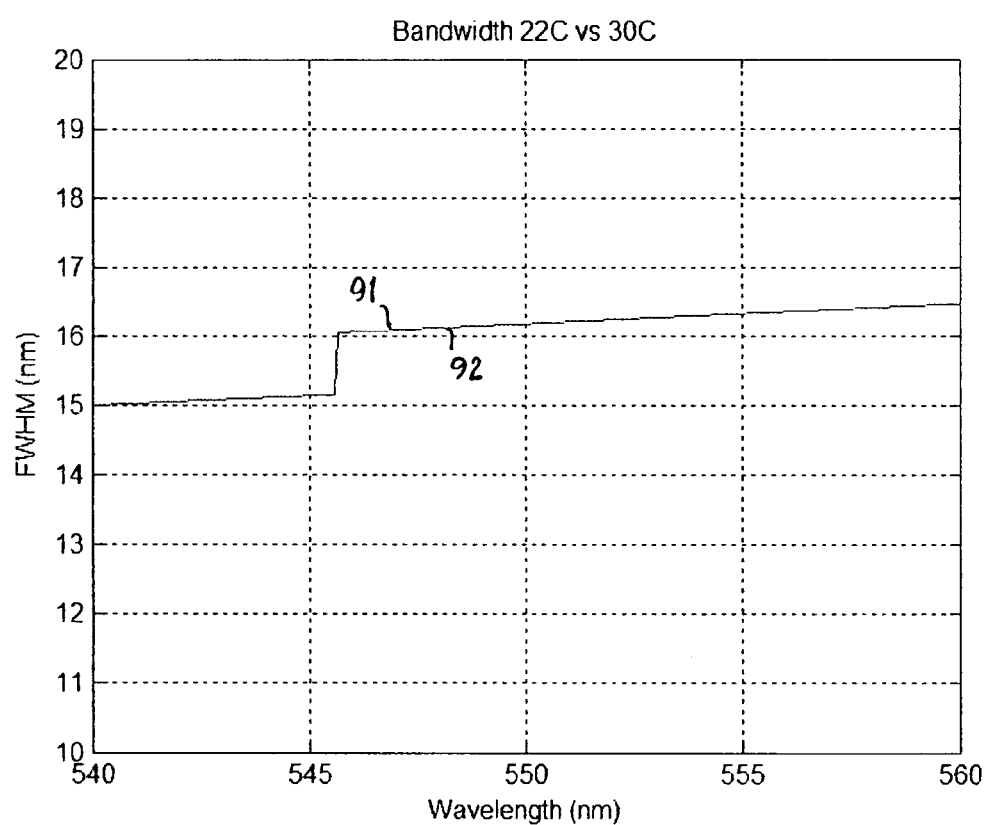
FIG. 9 shows the bandwidth of this filter stage at 22C and at 30C when the stage is tuned with the present invention as curves 91 and 92. The filter bandwidth $B(\lambda)$ is identical for the two temperatures, so the curves are indistinguishable. It still shows a discontinuous step in $\lambda$, but its $\lambda$ location does not vary with temperature.

The bandwidth implications of the order function N(λ) are shown in FIG. 6. In the region near 546 nm, the filter has a lower bandwidth at 22C than it has at 30C. This is because the filter stage is operated in a higher order N(λ) in the former case.

It is worth noting that, for certain wavelengths and temperatures, an infinitesimal change in temperature can cause the bandwidth to change by significant amounts. Consider a given discontinuity point in the N(λ) function. The wavelength of this point shifts with temperature as:

$$\lambda_2 - \lambda_1 = \lambda(1/R)(dR/dT)(T_2 - T_1) = \lambda TCR\, \delta T \quad [3]$$

where
- $T_1, T_2$ are two temperatures
- $\lambda_1, \lambda_2$ are the discontinuity wavelengths at temperatures $T_1, T_2$
- TCR is the normalized temperature coefficient of retardance, or $(1/R)\, dR/dT$ Recall that for wavelength regions where N(λ) has discontinuities, or steps, the bandwidth changes abruptly and significantly, as just illustrated. A filter tuned to a wavelength λ that lies within a distance δλ of a step discontinuity will operate in one order or another as a function of temperature, so will exhibit different bandwidth if the temperature changes by an amount $$\delta T \geq \delta\lambda (\lambda TCR) \quad [4]$$

This is a much more striking equation than it appears. It indicates that, for certain wavelengths that lie within close proximity to a discontinuity in the N(λ) function, the filter bandwidth will change markedly—perhaps several percent or more—for small, even infinitesimal, changes in temperature.

Such wavelengths may be termed 'critical' wavelengths, because the filter bandwidth B(λ) is critically sensitive to temperature changes when tuned to them. Which wavelengths are critical is a function of the fixed retarder thickness and type; the adjustment limits of the variable retarder; the tuning criterion for the stage, such as achieving a retardance of N, or N+¼, or N+½, or N+¾, for integral N; and the rules for choosing which value of $R_{variable}$ to use, if more than one is within its range. In the prior art, these factors were not designed with specific attention to controlling the critical wavelength values, so the latter were essentially happenstance.

The critical wavelength may be thought of as being a point for which, at a given operating temperature, an infinitesimal temperature change will cause the order N(λ) to change when the filter is tuned to this wavelength. Over a range of temperatures, there is a range of wavelengths for which this is true, so one may speak of a critical wavelength range. The wavelength extent of this range is simply $$\text{Critical range} = \delta T\, \lambda TCR \quad [5]$$

It is interesting to consider the tuning approach which performs temperature correction of center wavelength drift using a wavelength-scaled formalism. Here, a first filter control function generates the variable retardance values without taking any account of temperature. Absent any other control function, the filter transmission would change with temperature, because of thermal drift in the fixed retarder elements. However, a second filter controller function has access to temperature information, such as a sensor that indicates the temperature of the fixed retarders; and it also knows, or has an estimate of, the wavelength shift that would occur if no compensation were made.

To cause the filter to be tuned to a given target wavelength, the second filter controller function makes use of the information about temperature at the retarders, and about drift coefficient, from which it calculates a modified wavelength setting which is slightly shifted from the target value based on the actual temperature, as appropriate; this value is supplied to the first filter controller function, which it uses to calculate the variable retarder settings. Provided that the wavelength was properly modified, or scaled, by the second function, the filter produces the desired wavelength and compensates for thermal drift in the fixed retarders.

One can see that, from the perspective of the first control function, different wavelength values are requested (by the second control function) as the filter temperature changes. Thus, wavelengths that lie within critical wavelength bands will experience a change in order N(λ) as the wavelength scaling changes so as to produce a value to one side or the other of the critical wavelength.

In terms of the presence of critical wavelengths, and thermal dependence of bandwidth, the result is equivalent to that discussed earlier: the bandwidth changes markedly, even for small or infinitesimal thermal changes, when the filter is tuned to a location near a critical point. Thus, even filter stages in which the fixed retarder drifts by only a few nm, the bandwidth can change markedly when the filter is tuned.

One aspect of the invention is the correction of thermal drift in the fixed retarder elements by imposing a compensating shift in the variable retarder elements, without changing the order N(λ) over a preselected thermal range. Thus the filter has a bandwidth B(λ) that is unaffected by temperature. Such a filter athermalizes peak transmission, center wavelength, and bandwidth, so preserves overall signal strength over temperature.

To accomplish this invention, various elements are provided. First, the variable retarder must have sufficient range of adjustment that it can produce a net retardance that is independent of temperature over some predetermined temperature range, and meets the tuning criterion for all wavelengths of interest.

One can estimate the additional adjustment range involved, compared to a variable retarder which has the absolute minimum tuning range consistent with meeting the tuning criterion at all wavelengths. This range is termed the extra range, or ER.

In one preferred embodiment, the variable retarder has an ER value at least equal to the thermal drift in the retardance of the fixed retarder, over a selected range of temperatures:

$$ER = dR/dT\, \delta T = R*TCR*\delta T \quad [6]$$

EXAMPLE A

For quartz, the magnitude of TCR is 0.013%/C. A 1.5 mm thick retarder has a retardance of approximately 12.6 microns. So a filter based on this fixed retarder, designed for use in conditions from 15C-45C would provide an ER value of:

$$ER = 0.013\%/C * 12.6 \text{ microns} * 30C = 48 \text{ nm} \quad [7]$$

EXAMPLE B

For LiNbO3, the magnitude of TCR is 0.047%/C. A 1 mm thick retarder of this material has approximately 87 microns retardance. So a filter based on this fixed retarder designed for use over a 22C-27C range would provide ER of:

$$ER = 0.047\%/C * 87 \text{ microns} * 5C = 204 \text{ nm} \quad [8]$$

EXAMPLE C

For LiNbO3, the magnitude of TCR is 0.047%/C. A 1 mm thick retarder of this material has approximately 87 microns retardance. So a filter based on this fixed retarder, designed for use over the range 20-40C would provide ER of:

$$ER = 0.047\%/C * 87 \text{ microns} * 20C = 816 \text{ nm}$$

EXAMPLE D

For quartz, the magnitude of TCR is 0.013%/C. A 1 mm thick retarder has a retardance of approximately 8.9 microns. So a filter based on this fixed retarder, designed for use in conditions from 22C-27C would provide an ER value of:

$$ER = 0.013\%/C * 8.9 \text{ microns} * 5C = 5.5 \text{ nm} \quad [9]$$

ER values suitable for practicing the invention with other materials or thickness may be calculated this way using known retardance and temperature variation for the fixed retarder, and the desired operating temperature range.

A second aspect of the invention is a control element which performs its calculations in such a way as to produce a constant net retardance over the operating temperature range, so it produces constant $N(\lambda)$ and $B(\lambda)$ over temperature. This involves consideration of the variation in the fixed retarder over a target temperature range, and choosing a variable retarder setting $R_{variable}$ at any particular temperature which is consistent with the tuning criterion for the filter, and with maintaining the same value of $N(\lambda)$ at all temperatures within the target range.

The control element is commonly a computer or microprocessor, executing an algorithm which performs a tuning calculation and then chooses the variable retarder setting $R_{variable}$ in accordance with the principles of this invention. Other elements known in the art can be used as well, such as digital signal processors (DSPs) or field-programmable gate arrays (FPGAs), if that is desired; what is central is that the appropriate result be achieved.

In a first embodiment, the control element performs an algorithm which incorporates knowledge of the temperature range over which the filter is to operate without change in FWHM. It calculates the variable retarder setting $R_{variable}$ which produces the desired filter wavelength, according to tuning criterion such as a net retardance of $N\lambda$, $(N+\frac{1}{2})\lambda$, $(N+\frac{1}{4})\lambda$, or $(N+\frac{3}{4})\lambda$. These values are calculated for the two endpoints of the temperature range, and can be calculated for other temperatures within this range, such as the current filter temperature. It then identifies whether there has been a discontinuous step in the value of $R_{variable}$ as a function of temperature, and if there has been, it adjusts the value of $R_{variable}$ to eliminate this step. This adjustment involves increasing or decreasing $R_{variable}$ by one order, or a retardance of $\lambda$, to maintain a fixed value of $N(\lambda)$ over temperature.

For example, if it would be in order N=27 over part of the temperature range and in order N=26 over another part of the range, then the value is altered in one or the other portion of the range, consistent with the adjustment range of the variable retarder element. Various methods can be implemented for making the decision about whether to increase the lower order, or decrease the upper order, as will be discussed next. The decision is based on factors such as whether the retarder opposes or adds to the fixed retarder; what the adjustment range of the retarder is; and whether other factors such as response time or optical quality favor operating at a higher retardance or lower retardance.

In some filters, the thermal drift in the retardance of the fixed retarder over the target temperature range is relatively small ($dR < \lambda/2$), and the decision can be made using relatively simple rules.

This is illustrated using the retarder of Example A, operated over the temperature range, for which the drift in retardance is dR=48 nm over the range [$T_{min}$=15C, $T_{max}$=45C]. This is used to construct a filter which is operated over the wavelength range 420 nm-700 nm. Such a design meets the condition $dR < \lambda/2$ for all wavelengths, and one may use the following simple decision process to practice the invention:

Rule Set 1.
i. Find the lowest value of retardance which lies within the variable retarder's range, and which also meets the tuning criterion, at $T_{min}$; this is termed $R_{try}(T_{min})$
ii. Find $R_{try}(T_{max})$ using the same method
iii. Find $R_{try}(T_{actual})$ using the same method
iv. Determine any adjustment $R_{adj}$ to $R_{try}$ using the following steps
v. If all values of $R_{try}$ agree within $\lambda/2$, there was no discontinuity; $R_{adj}=0$
vi. Otherwise, if $R_{try}(T_{actual})$ is within $\lambda/2$ of the higher of the other two, $R_{adj}=0$
vii. Otherwise, $R_{adj}=\lambda$
viii. Apply the adjustment: set the variable retarder to $R_{variable}=R_{try}(T_{actual})+R_{adj}$ These rules select the lowest variable retarder value consistent with maintaining constant $N(\lambda)$ and $B(\lambda)$ over temperature. The value $R_{try}$ is adjusted upward only as needed, if there is a step discontinuity. The logic ensures the variable retarder setting $R_{variable}$ will vary by less than $\lambda/2$ over temperature, and is free of discontinuities. Since the retardance of the fixed retarder is free of discontinuities with temperature and varies by less $\lambda/2$ over the thermal range, the net retardance must also be free of discontinuities, so must be constant. These rules can be used when the retardance of the variable retarder adds with that of the fixed retarder, or in the case when they are opposed.

Alternatively, one may use rules that favor using the highest variable retarder value consistent with maintaining constant $N(\lambda)$ and $B(\lambda)$ over temperature:

Rule Set 2.
i. Find the highest value of retardance which lies within the variable retarder's range, and which also meets the tuning criterion, at $T_{min}$; this is termed $R_{try}(T_{min})$
ii. Find $R_{try}(T_{max})$ using the same method
iii. Find $R_{try}(T_{actual})$ using the same method
iv. Determine any adjustment $R_{adj}$ to $R_{try}$ using the following steps
v. If all values of $R_{try}$ agree within $\lambda/2$, there was no discontinuity; $R_{adj}=0$
vi. Otherwise, if $R_{try}(T_{actual})$ is within $\lambda/2$ of the lower of the other two, $R_{adj}=0$
vii. Otherwise, $R_{adj}=\lambda$
viii. Apply the adjustment: set the variable retarder to $R_{variable}=R_{try}(T_{actual})-R_{adj}$ Here the value $R_{try}$ is adjusted downward only as needed, if there is a step discontinuity. Like the previous rule set, this can be used when the retardance of the variable retarder adds with that of the fixed retarder, or in the case when they are opposed.

It is possible to practice the invention using retarders such as that of Example C, for which the retardance varies by an amount $dR>\lambda/2$. However, the rules above will not work in all cases, and $R_{variable}$ must take account of the more complicated set of possibilities.

In one embodiment, the invention uses the following procedure:

Rule Set 3.
i. Define M sub-ranges that span the range, where $\delta R<\lambda/4$ across each sub-range
ii. Use Rule Set 1 to determine $R_{variable\ sr}(T_{mean\ sr})$ for each sub-range, where $T_{mean\ sr}=(T_{max\ sr}+T_{min\ sr})/2$
iii. Use Rule Set 1 to determine $R_{variable\ sr}(T_{actual})$
iv. Determine a direction by comparing $R_{variable\ sr}$ for the a chosen sub-range and its neighboring sub-range: the direction is said to be positive if these values increase with temperature, and negative if the values decrease with temperature. If $R_{variable\ sr}$ differs by $\lambda/2$ or more for this pair of sub-ranges, use a different pair of sub-ranges to determine direction
v. Determine an overall adjustment $R_{overall\ adj}$ as follows, using instructions for positive (negative) direction as instructed
vi. Set $R_{overall\ adj}=0$
vii. If the temperature sub-range which includes $T_{actual}$ is not the coldest (warmest) sub-range, calculate $R_{variable\ sr}(T_{actual})-R_{variable\ sr}(T_{mean\ sr})$ for the next cooler (warmer) sub-range; if the difference is negative, increase $R_{overall\ adj}$ upward by $\lambda$
viii. If the adjacent range is not the coldest (warmest) range, continue toward the coldest (warmest) sub-range, calculating the difference between the $R_{variable\ sr}(T_{mean\ sr})$ values. If it exceeds $\lambda/2$ in magnitude, increase $R_{overall\ adj}$ upward by $\lambda$.
ix. Continue this process until the coldest (warmest) range is reached
x. Apply the adjustment: $R_{variable}=R_{variable\ sr}(T_{actual})+R_{overall\ adj}$ This will choose the lowest value of $R_{variable}$ consistent with the tuning criterion and with maintaining a constant $N(\lambda)$ and $B(\lambda)$ over the temperature range.

Alternatively, a set of rules that will choose the highest value of $R_{variable}$ consistent with the tuning and with maintaining a constant $N(\lambda)$ and $B(\lambda)$ over temperature is:

Rule Set 4.
i. Define M sub-ranges that span the range, where $\delta R<\lambda/4$ across each sub-range
ii. Use Rule Set 2 to determine $R_{variable\ sr}(T_{mean\ sr})$ for each sub-range, where $T_{mean\ sr}=(T_{max\ sr}+T_{min\ sr})/2$
iii. Use Rule Set 2 to determine $R_{variable\ sr}(T_{actual})$
iv. Determine a direction by comparing $R_{variable\ sr}$ for the a chosen sub-range and its neighboring sub-range: the direction is said to be positive if these values increase with temperature, and negative if the values decrease with temperature. If $R_{variable\ sr}$ differs by $\lambda/2$ or more for this pair of sub-ranges, use a different pair of sub-ranges to determine direction
v. Determine an overall adjustment $R_{overall\ adj}$ as follows, using instructions for positive (negative) direction as instructed
vi. Set $R_{overall\ adj}=0$
vii. If the temperature sub-range which includes $T_{actual}$ is not the warmest (coolest) sub-range, calculate $R_{variable\ sr}(T_{actual})-R_{variable\ sr}(T_{mean\ sr})$ for the next warmer (cooler) sub-range; if the difference is positive, increase $R_{overall\ adj}$ by $\lambda$
viii. If the adjacent range is not the warmest (coolest) range, continue toward the warmest (coolest) sub-range, calculating the difference between the $R_{variable\ sr}(T_{mean\ sr})$ values. If it exceeds $\lambda/2$ in magnitude, increase $R_{overall\ adj}$ by $\lambda$.
ix. Continue this process until the warmest (coolest) range is reached
x. Apply the adjustment: $R_{variable}=R_{variable\ sr}(T_{actual})-R_{overall\ adj}$ Other rule sets may be used to practice the invention, provided they have the same objective and produce the same result: that $R_{net}$ be free of discontinuities, and that $N(\lambda)$ and $B(\lambda)$ be constant, over the target temperature range.

In yet another aspect, the invention consists of a multispectral imaging system that incorporates an athermalized tunable filter.

Figure 1A:
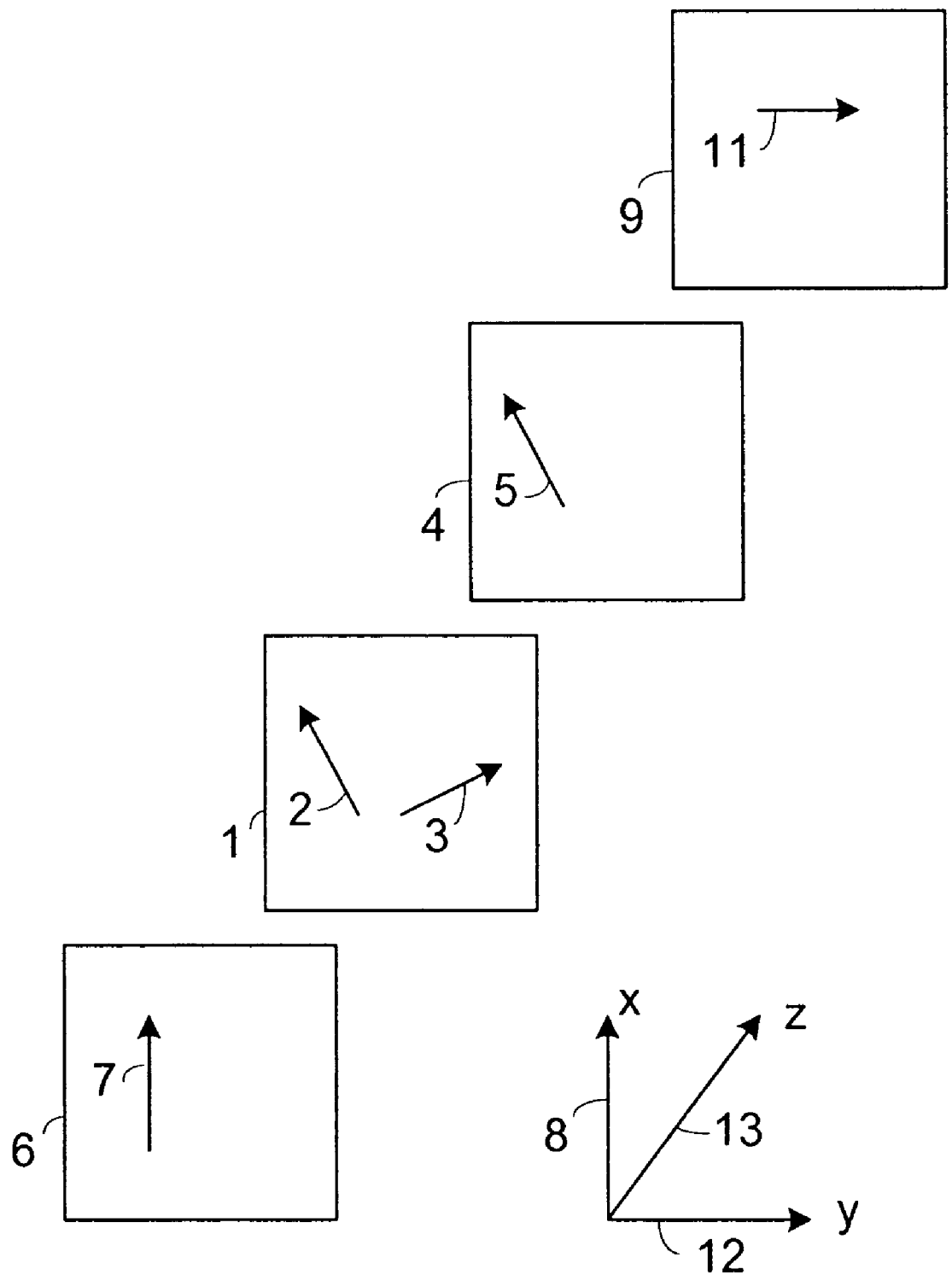
FIG. 1A shows a single stage of a tunable Lyot filter. The stage consists of a 1 mm thick piece of quartz 1, having its slow axis oriented along direction 2 and its fast axis oriented along direction 3; combined in optical series with a liquid crystal variable retarder 4 with its slow axis oriented along direction 5; with entrance polarizer 6 having its transmission axis 7 oriented parallel to the x axis 8; and exit polarizer 9 having its transmission axis 11 oriented along the y axis 12. Light passes through the assembly along the z axis 13. The quartz has a retardance that varies with temperature by −133 ppm/C.
Figure 1B:
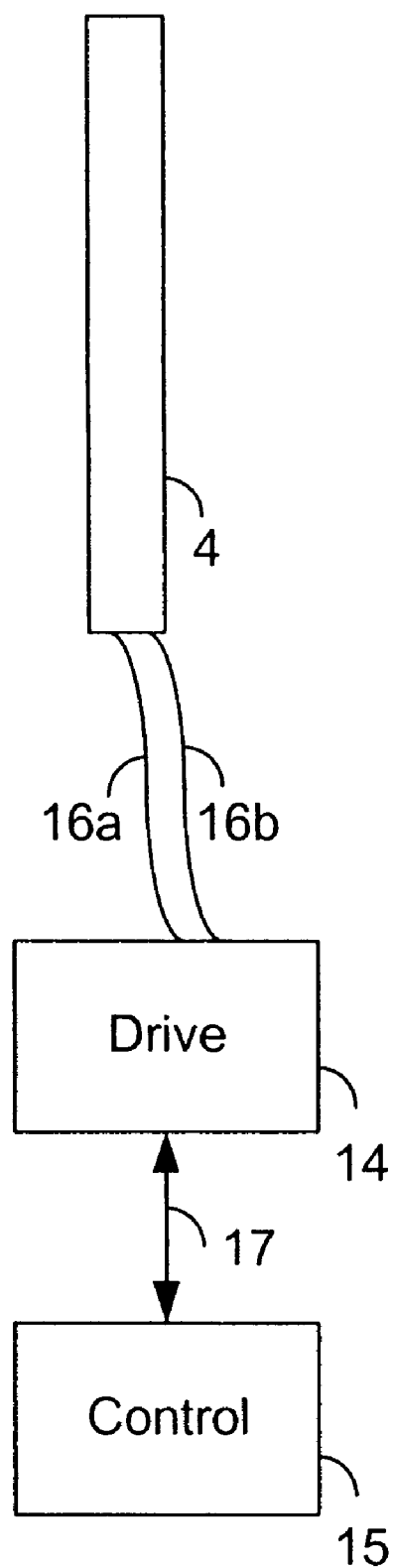
FIG. 1B shows the variable retarder 4 connected to a drive circuit 14 by lines 16a, 16b. The variable retarder 4 can express retardance values from 100 nm to 820 nm, depending on the voltage applied to it by the drive circuit 14, according to commands transmitted from control circuit 15 by transmission 17.
Figure 10:
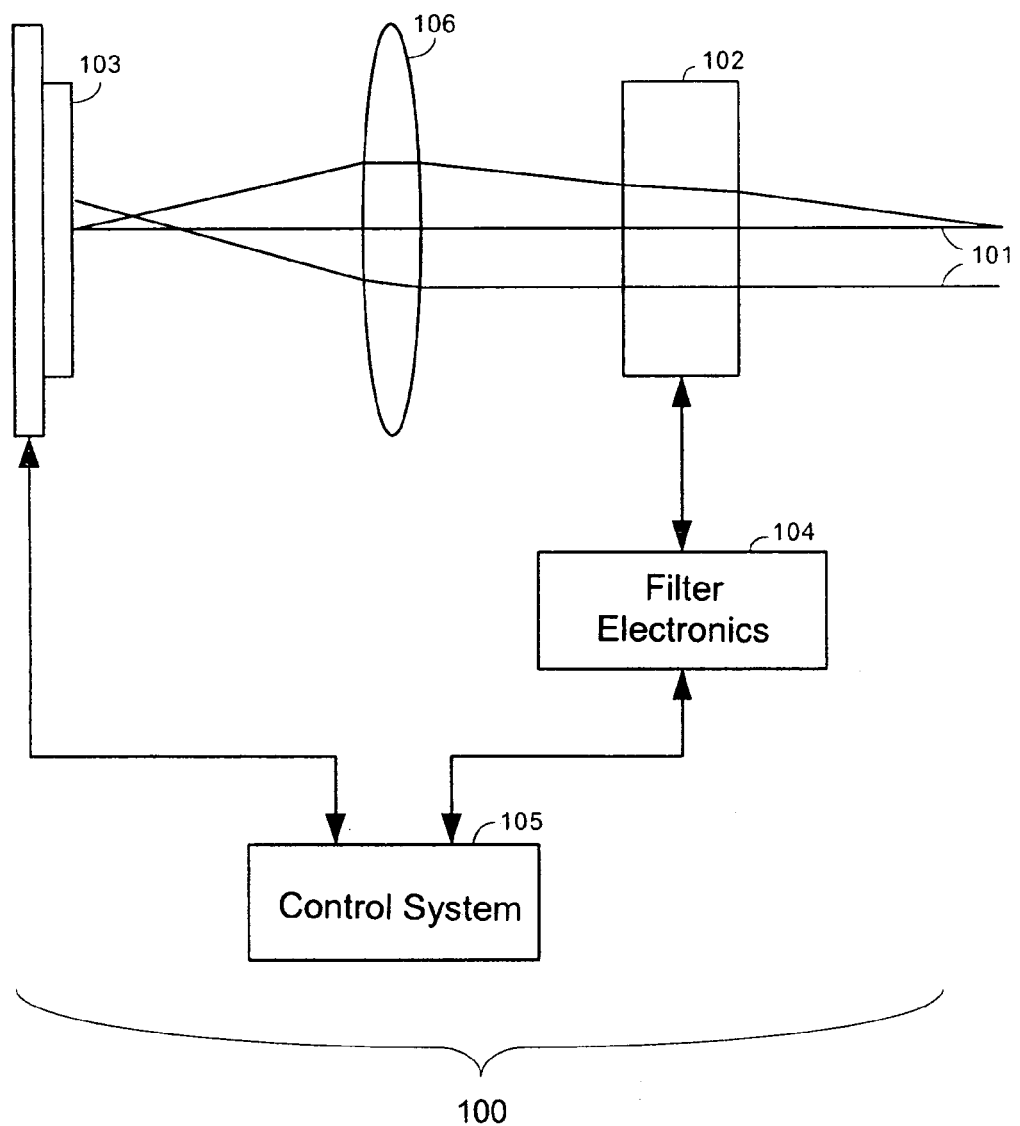
FIG. 10 is a block diagram showing a multispectral imaging system that incorporates a tunable filter incorporating one or more dynamic bandwidth stages, an imaging detector, optional relay optics, filter electronics, and control electronics.

FIG. 10 shows a multispectral imaging system 80 in accordance with the present invention. Light rays 101 enter the system and pass through birefringent filter 102 which is athermalized according to the present invention. Filter 102 can be, for example, the filter shown in FIG. 1, and its optical design properties such as bandwidth and tuning range are chosen to provide a desired system response according to the requirements or application at hand. This produces a multispectral imaging system which is athermalized in terms of its order N, and has improved thermal stability of response as a result.

The filtered light passes through optional relay lens 106, if present, and proceeds to form an image on imaging sensor 103. The optional relay lens 106 may be included to provide an overall increase or decrease in the optical magnification of the system, or to relay an image formed elsewhere in an optical system and re-image it at the surface of sensor 103 or for other purposes such as image inversion, changing the position or size of pupils or images, or for other purposes; or for a combination of these purposes, as is known in the art of optical design.

Alternatively, the arrangement of the relay lens and the filter may be reversed; that is, the light may first pass through the relay lens and then through the filter. In other cases, a lens may be present on both sides of the filter, where the arrangement produces an overall optical action. The decision to choose one arrangement over the other may be made on the basis of optical design principles, on ray-tracing models, or on the basis of actual measurements (which may be guided by design principles, ray tracing models, or both), according to the preference of the designer. Suitable programs for optical ray-tracing include Zemax from the Zemax Development Corporation, (Bellevue Wash.). Preferably, the relay lens will be an apochromat type or other design that is chosen to produce low image distortion over the spectral range of the filter. Or, relay lens 106 may be omitted entirely if it is not required.

Imaging sensor 103 may be a CCD or CMOS camera. In one preferred embodiment, this is a Retiga EXi camera from QImaging Corporation (Vancouver, BC, Canada). This provides a two-dimensional image of a scene, with spatial resolution of up to 1040×1392 pixels, and communicates with other components or systems via a FireWire interface. In another embodiment, it is a sensor based on the KLI-5001 linear image sensor from the Eastman Kodak Company, Image Sensor Solutions division (Rochester, N.Y.). This produces a 1-D image of a linear portion of a scene, with 5000×1 resolution. In another embodiment, the sensor 103 is an infrared sensor made of InGaAs such as the SU320M-1.7RT from Goodrich Corporation (Princeton N.J.), which provides a 2-dimensional image of a scene in the 850-1700 nm spectral range, with spatial resolution 320×240 pixels. It provides digital data on an EIA-422 interface.

Filter electronics 104 produce electrical signals to tune the filter and provide athermalized response in accordance with the present invention. These electronics are in communication the filter, and with control system 105 that coordinates the overall image acquisition and filter tuning. Control system 105 is often a personal computer and associated interface circuits, but it may be a dedicated control system such as a microcontroller, microprocessor, FPGA, or DSP-based system. The choice of one type of control system over another may be made on the basis of factors such as cost, miniaturization, power consumption, operating speed, and so on, as are known in the electrical engineering art. The communication between the filter electronics 104 and control system 105, or between imaging sensor 103 and control system 105, may be direct, as indicated in FIG. 10 by the interface 105, or may be indirect. For example, filter electronics 103 may include a USB2 hub and the camera interface may pass through this hub, and then to control system 105.

Control system 105 acts to coordinate the filter tuning and the image acquisition. A personal computer operating Nuance software from CRI Inc (Woburn, Mass.) is suitable for this purpose.

In the above description, while the invention has been illustrated using a Lyot filter as an illustrative example, the invention can be practiced to create an athermalized Solc filter, or a split-element filter, or any other type of birefringent filter whatsoever; regardless of the specific filter type, and its associated tuning criterion, what is germane is that a variable retarder element is used together with fixed retarders to achieve a combined effect in the filter. In such filters, the invention can be used to produce a filter with compensation of drift in the fixed retarder element(s), for which $N(\lambda)$ and $B(\lambda)$ are independent of temperature.

As noted above, while the retarders in the example of FIG. 1 have been combined in an arrangement where the retardances of a fixed quartz retarder and of a liquid crystal variable retarder are additive, the invention can be practiced in a comparable arrangement where the retardances of these two elements are opposed; using the same principles.

One may substitute any type of retarder in place of the quartz retarder, according to the need at hand, for reasons such as cost, size, convenience, optical properties, thermal coefficients of response, or indeed for any reason that is relevant for a given situation; without deviating from the invention.

Similarly, while an example has been shown where the variable retarder is a nematic liquid crystal type, the invention may be practiced with any variable retarder which is capable of providing the necessary optical response, other variable retarders may be used as well. These could include other types of liquid crystal retarders such as ECB, pi-cell, smectic A, smectic C, or any other type of liquid crystal variable retarder; it could include other electro-optic retarders such as Kerr cells or Pockels cells; or mechanically adjusted retarders such as Soleil-Babinet compensators, strained-film retarders, or any other type of variable retarder whatsoever. What is central to the invention is that it provide an adjustable amount of retardance, with a sufficient adjustment range to practice the invention.

Also, where a filter may be constructed from one or more individual stages, it is not essential that all stages of the filter incorporate the invention, though this is often preferred. The effect of the invention upon the overall filter is understood primarily by considering the role that the stage plays; thus athermalizing the spectrally narrowest stage of a filter tends to athermalize the bandwidth $B(\lambda)$, while other stages will tend to govern other aspects of the filter behavior. In any case, it is possible to use modeling such as Jones calculus models, or direct experiment, to determine what effect or benefit is attained by practicing the invention on a given stage or stages.

These options and possibilities can be combined in ways that will be understood by those in the art, to produce athermalized birefringent filter stages and filters with a wide variety of designs, materials, and optical properties. Accordingly it will be understood that the scope of this invention be limited only by the claims attached hereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A tunable filter stage having a selected temperature range, comprising:
    a variable retarder element with an adjustable first retardance;
    a fixed retarder element with a second retardance, wherein the second retardance exhibits a thermally dependent characteristic such that the second retardance varies with temperature; and
    a control element in communication with the variable retarder element which adjusts the first retardance,
    wherein the control element selects a target retardance for the variable retarder element based on a selected temperature range and the thermally dependent characteristic of the second retardance.

2. The tunable filter stage of claim 1, wherein the control element is configured to receive a signal indicating an estimate of an actual temperature of the tunable filter.

3. The tunable filter stage of claim 1, wherein the control element is configured to select the target retardance so that a bandwidth of the tunable filter is substantially unchanged over the selected temperature range.

4. The tunable filter stage of claim 1, wherein the control element is configured to select the target retardance so that a passband and a bandwidth of the tunable filter are substantially unchanged over the selected temperature range.

5. The tunable filter stage of claim 2, wherein the control element is configured to select the target retardance so that a bandwidth of the tunable filter is substantially unchanged over the selected temperature range.

6. The tunable filter stage of claim 2, wherein the control element is configured to select the target retardance so that a passband and a bandwidth of the tunable filter are substantially unchanged over the selected temperature range.

7. The tunable filter stage of claim 5, wherein a scaled-wavelength approach is used to compensate for variation in the second retardance caused by temperature.

8. The tunable filter stage of claim 6, wherein a scaled-wavelength approach is used to compensate for variation in the second retardance caused by temperature.

9. The tunable filter stage of claim 1, wherein the variable retarder element comprises a nematic liquid crystal cell.

10. The tunable filter stage of claim 1, wherein the selected temperature range covers at least 5° C.

11. The tunable filter stage of claim 1, wherein the retardance variation of the second retardance is at least 6 nm over the selected temperature range.

12. The tunable filter stage of claim 1, wherein the retardance variation of the second retardance is at least 48 nm over the selected temperature range.

13. The tunable filter stage of claim 1, wherein the retardance variation of the second retardance is at least $\lambda/4$ over the selected temperature range.

14. The tunable filter stage of claim 1, wherein the retardance variation of the second retardance is at least $\lambda/2$ over the selected temperature range.

15. The tunable filter stage of claim 1, wherein the variable retarder element has a sufficient range of adjustment such that the tunable filter produces a net retardance that is independent of temperature over the selected operating temperature range.

16. The tunable filter stage of claim 1, wherein the control element is configured to select a target retardance such that an order of the fixed retarder is maintained over the selected operating temperature range.

17. A method of operating a tunable filter having a variable retarder element with an adjustable first retardance and a fixed retarder with a second retardance, wherein the second retardance exhibits a thermally dependent characteristic such that the second retardance varies with temperature, said method comprising the step of:

adjusting, by a control element, the first retardance of the variable retarder element to a target retardance, wherein the target retardance is determined based on a selected operating temperature range and the thermally dependent characteristic of the second retardance.

18. The method of claim 17, wherein said step of adjusting further comprises providing the variable retarder element with a sufficient range of adjustment such that the tunable filter produces a net retardance that is independent of temperature over the selected operating temperature range.

19. The method of claim 17, wherein said step of adjusting is performed so that discontinuities in a bandwidth of the tunable filter are minimized or eliminated within the selected operating temperature range.

20. The method of claim 17, wherein said step of adjusting is performed so that discontinuities in a passband and a bandwidth of the tunable filter are minimized or eliminated within the selected operating temperature range.

21. The method of claim 17, wherein said step of adjusting comprises selecting a target retardance such that an order of the fixed retarder is maintained over the selected operating temperature range.

22. The method of claim 17, further comprising the step of determining an actual temperature of the tunable filter before said step of adjusting, wherein the target retardance is determined based on the actual temperature, the selected operating temperature range, and the thermally dependent characteristic of the second retardance.

23. The method of claim 17, wherein said step of adjusting comprises using a scaled-wavelength approach to compensate for thermal drift of the fixed retarder element.

24. The method of claim 17, wherein the selected operating temperature range covers at least 5° C.

25. The method of claim 17, wherein the variable retarder element comprises a nematic liquid crystal cell.

26. The method of claim 17, wherein the retardance variation of the fixed retarder is at least 6 nm over the selected operating temperature range.

27. The method of claim 17, wherein the retardance variation of the fixed retarder is at least 48 nm over the selected operating temperature range.

28. The method of claim 17, wherein the retardance variation of the fixed retarder is at least $\lambda/4$ over the selected operating temperature range.

29. The method of claim 17, wherein the retardance variation of the fixed retarder is at least $\lambda/2$ over the selected operating temperature range.

30. A multispectral imaging system, comprising:

an imaging photodetector which images filtered input light, and a tunable filter which filters input light, the tunable filter further comprising a variable retarder element with an adjustable first retardance and a fixed retarder element with a second retardance, wherein the second retardance exhibits a thermally dependent characteristic such that the second retardance varies with temperature; and a control element in communication with the variable retarder element which adjusts the first retardance, wherein the control element selects a target retardance for the variable retarder element based on a selected temperature range and the thermally dependent characteristic of the second retardance.

31. The multispectral imaging system of claim 30, further comprising a lens.

32. The multispectral imaging system of claim 31, wherein the filtered light passes through the lens.

33. The multispectral imaging system of claim 32, wherein the input light passes though the lens.

34. The multispectral imaging system of claim 30, wherein the imaging detector comprises a two-dimensional array of pixels.

35. The multispectral imaging system of claim 30, wherein the imaging detector comprises a one-dimensional away of pixels.

36. The multispectral imaging system of claim 30, wherein the control element is configured to select a target retardance such that an order of the fixed retarder is maintained over the selected operating temperature range.

37. A method of operating a multispectral imaging system which comprises a tunable filter and an imaging detector, the tunable filter having a variable retardance, the method comprising the steps:
  determining a temperature range over which the tunable filter operates;
  commanding the tunable filter to a first configuration wherein it transmits light of a first selected wavelength range, said step of commanding comprising adjusting the variable retardance to a target retardance, wherein the target retardance is determined based on the determined operating temperature range and a thermally dependent characteristic of the tunable filter; and
  taking an image with the imaging detector in that first filter configuration.

38. The method of claim 37, wherein said step of adjusting further comprises providing the variable retarder element with a sufficient range of adjustment such that the tunable filter produces a net retardance that is independent of temperature over the selected operating temperature range.

39. The method of claim 37, wherein said step of adjusting is performed so that discontinuities in a bandwidth of the tunable filter are minimized or eliminated within the selected operating temperature range.

40. The method of claim 37, further comprising the steps of:
  commanding the tunable filter to a second configuration wherein it transmits light of a second selected wavelength range, said step of commanding the tunable filter to a second configuration comprising adjusting the variable retardance to a target retardance, wherein the target retardance is determined based on the determined operating temperature range and a thermally dependent characteristic of the tunable filter; and
  taking an image with the imaging detector in the second filter configuration.

* * * * *